8/4/87 OR H 000,316

United States Statutory Invention Registration [19]

[11] Reg. Number: H316

Kowalik et al. [43] Published: Aug. 4, 1987

[54] HYDROCARBON DRAG REDUCTION WITH INTERPOLYMER COMPLEXES CONTAINING NOVEL SULFO-OCTENE

[75] Inventors: Ralph M. Kowalik, Bridgewater; Joseph Wagensommer, Westfield; Ilan Duvdevani, Leonia; Pawan K. Agarwal, Bridgewater, all of N.J.

[73] Assignee: Exxon Research and Engineering Co., Florham Park, N.J.

[21] Appl. No.: 858,673

[22] Filed: May 2, 1986

[51] Int. Cl.[4] ..... F17D 1/16; F17D 1/18

[52] U.S. Cl. ..... 137/13

[58] Field of Search ..... 137/13

[56] References Cited

U.S. PATENT DOCUMENTS

| | | | |
|---|---|---|---|
| 3,910,856 | 10/1975 | Kruka et al. | 137/13 |
| 4,407,321 | 10/1983 | Wilski et al. | 137/13 |
| 4,460,758 | 7/1984 | Peiffer et al. | 137/13 |
| 4,508,128 | 4/1985 | Kowalik et al. | 137/13 |
| 4,527,581 | 7/1985 | Motier | 137/13 |
| 4,584,339 | 4/1986 | Lundberg et al. | 137/13 |

FOREIGN PATENT DOCUMENTS

| | | | |
|---|---|---|---|
| 652665 | 11/1962 | Canada | 137/13 |

*Primary Examiner*—John F. Terapane
*Assistant Examiner*—Susan Wolffe
*Attorney, Agent, or Firm*—Richard E. Nanfeldt

[57] ABSTRACT

A method for reducing the frictional drag of an organic liquid in flow through pipes or conduits having a continuous bore therethrough which comprises adding about 0.001 to about 0.5 grams of a polymeric complex to 100 ml of said organic liquid, wherein the polymeric complex is the reaction product of a metal neutralized sulfonated octene-1/ethylene/ethylidene norborene terpolymer and a basic nitrogen-containing copolymer, said basic nitrogen containing copolymer being a copolymer of vinylpyridine with another monomer selected from the group consisting of styrene, t-butyl styrene, alkylacrylate, alkylmethacrylate, butadiene, isoprene, vinyl chloride and acrylonitrile.

4 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

HYDROCARBON DRAG REDUCTION WITH INTERPOLYMER COMPLEXES CONTAINING NOVEL SULFO-OCTENE

FIELD OF THE INVENTION

To flow liquids in pipes energy must be expended to overcome frictional losses. This energy is extracted from the liquid pressure, which decreases along the pipe in the direction of flow. For a fixed pipe diameter these pressure drops increase with increasing flow rate. When flow in the pipe is turbulent (flow Reynolds number which equals mean fluid velocity times pipe diameter divided by fluid kinematic viscosity greater than about 2,000) the relationship between pressure drop and flow rate can be altered by the addition of small amounts of certain high molecular weight polymers to the liquid. These polymers interact with the turbulent flow processes and reduce frictional pressure losses such that the pressure drop for a given flow rate is less, or the flow rate for a given pressure drop is larger. This phenomenon is commonly called drag reduction. It has been used in commercial oil pipelines, fire hoses and storm sewers to increase the flow capacities of existing systems. It can also be used to reduce supply pressures, pumping costs, and/or pipe diameters for given flow capacities.

BACKGROUND OF THE INVENTION

High molecular weight hydrocarbon soluble polymers, such as polyisobutylene, polystyrene and several alpha olefins, have been demonstrated to reduce drag in turbulent flows of hydrocarbon liquids. Generally, the drag reduction effectiveness of these polymers improves with increasing molecular weight; however, the tendency for the polymers to permanently degrade via molecular scission in local extensional flows within pumps or turbulent pipeflows also increases with increasing polymer molecular weight. This invention discloses efficient drag reduction in organic liquids resulting from a novel class of interpolymer complexes containing sulfonated copolymers of alpha olefins.

It is well known that alpha olefins can be polymerized in the presence of coordination catalysts (Ziegler-Natta). These catalysts generally consist of materials such as transition metal halides (e.g., $TiCl_3$) and organometallic cocatalysts (e.g., $R_3Al$ or $R_2AlCl$). Most of the efforts in this field have centered on maximizing catalyst activity and polymer stereoregularity/crystallinity (e.g., U.S. Pat. Nos. 3,116,274, 3,476,730, 3,156,681 and 4,240,982). Items of commerce in this category are isotactic polypropylene and poly(1-butene). These stereoregular, crystalline polymers have excellent physical and mechanical properties and are well suited to forming molded objects, such as pipe or tubing, which require rigidity. However, these materials have limited use as polymer additives to hydrocarbon solutions (e.g., viscosifiers, drag reducers, antimisting agents).

A smaller body of knowledge exists on the preparation of ultra-high molecular weight noncrystalline alpha olefins suitable for use as hydrocarbon viscosifiers, drag reducing agents or antimisting additives, etc. Examples of such art are found in U.S. Pat. Nos. 4,289,679, 4,358,572, 4,371,455 and British Pat. No. GR 2074,175A. The noncrystalline nature of these polymers makes them amenable to easy dissolution in organic media. However, these materials are completely nonfunctional and their solution properties can be optimized only by adjustment of polymer molecular weight (+ distribution). In other words, there are no reactive groups on these chains suitable for modification or interaction.

Reports of functional alpha olefins in Ziegler-Natta polymerizations are sparse. A notable exception is the copolymerization of propylene with the methyl ester of undecanoic acid (Japanese Patent Application Nos. 57-152767, 57-188996, 57-188997). However, the product of this reaction is characterized by very low levels (0.1–0.3 mole percent) of functional group incorporation. Also, this polymer product is highly crystalline and, thus, not useful as hydrocarbon viscosifiers, drag reducing agents or antimisting additives.

The instant invention is distinguished from the functional/short chain alpha olefin art (Japanese Patent Application Nos. 57-152767, 57-188996, 57-188997) by the lower levels of crystallinity. Thus, the instant composition is useful for hydrocarbon solution applications, e.g., drag reduction, viscosification, antimisting additives, etc., whereas the crystalline polymers of prior art are not. In the instant invention functionalization of a copolymer of octene-1 is achieved by sulfonation, which in turn enables association of shorter molecular weight chains into a larger system effective for drag reduction. The sulfonation requires a copolymerization with a monomer resulting in a double bond in or pendent to the polymeric chain.

In U.S. Pat. No. 4,508,128 complexes of Zn-S-EPDM/styrene vinylpyridine are described. The complexes of the instant invention are more soluble in organic liquids, such as crude oil, than those described in U.S. Pat. No. 4,508,128 as a result of the inherently lower levels of crystallinity obtained with 1-octene rather than ethylene/propylene (EP) polymers. This enhanced solubility is most pronounced for very high molecular weight (> 1,000,000) polymers and generally improves polymer drag reduction activity.

The present invention discloses drag reduction agents for organic liquids which are polymer complexes of a copolymer of polystyrene vinylpyridine complexed with a zinc salt of a sulfonated 1-octene/ethylene/ethylidene norborene terpolymer.

SUMMARY OF THE INVENTION

The present invention relates to unique and novel drag reduction agents for organic liquids which are organic solutions of water insoluble polymer complexes of a copolymer of polystyrene vinylpyridine complexed with a zinc salt of a sulfonated octene/ethylene/ethylidene norborene terpolymer. The necessary concentration range of the polymer complex in the hydrocarbon liquid in order to have an effective drag reduction agent is about 0.001 to about 1.00 grams polymer complex per 100 ml of organic liquid.

DESCRIPTION OF THE PREFERRED EMBODIMENTS

The present invention relates to unique and novel drag reduction agents for hydrocarbon liquids which are hydrocarbon solutions of water insoluble polymer complexes of a copolymer of polystyrene vinylpyridine complexed with a zinc salt of a sulfonated 1-octene/ethylene/ethylidene norborene terpolymer. The necessary concentration range of the polymer complex in the hydrocarbon liquid in order to have an effective drag reduction agent is about 0.001 to about 1.00 grams polymer complex per 100 ml of hydrocarbon liquid.

The salt of the octene-1/ethylene/ENB terpolymer has the formula:

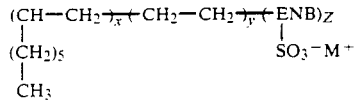

wherein x is about 40 to about 98 mole percent, more preferably about 45 to about 90, and most preferably about 50 to about 80; y is about 1 to about 60 mole percent, more preferably about 2 to about 50 and most preferably about 3 to about 40; the balance between 100% and the the combined x and y is the mole percent ENB; Z represents the mole percent of sulfonated species attached to ENB where z is about 0.1 to about 10 mole percent, more preferably about 0.1 to about 8.0 mole percent and most preferably about 2 to about 6; and $M^+$ represents a transition metal ion. The balance of such an ion can be greater than one (e.g., zinc) in which case one ion can neutralize more than one sulfonate group or can be attached to another group (such as acetate). The number average molecular weight of the sulfonated terpolymer as measured by GPC is about 10,000 to about 20,000,000, more preferably 50,000 to about 15,000,000 and most preferably about 100,000 to 10,000,000.

The process for preparing the sulfonated polymer comprises the steps of terpolymerization of octene-1/ethylene, and ethylidene norborene with a $VCl_4$ and ethylene-sesquichloride catalyst in an alkane solvent at a temperature of about 0° C. to about 60° C. for about 3 minutes to about 4 hours under an inert atmosphere to form the terpolymer of octene-1/ethylene/ethylidene norborene. The terpolymer is recovered from solution by precipitation with an antisolvent and purified by redissolving in an alkane solvent with an antisolvent.

In carrying out the process to form the sulfonated polymer the terpolymer of octene-1/ethylene/ethylidene norborene, the terpolymer is dissolved in a non-reactive solvent, such as a chlorinated aliphatic solvent, chlorinated aromatic hydrocarbon, an aromatic hydrocarbon or an aliphatic hydrocarbon, such as carbon tetrachloride, dichloroethane, chlorobenzene, benzene, toluene, xylene, cyclohexane, pentane, isopentane, hexane, isohexane or heptane. The preferred solvents are the lower boiling aliphatic hydrocarbons. A sulfonating agent is added to the solution of the elastomeric polymer and non-reactive solvent at a temperature of about −100° C. to about 100° C. for a period of time of about 1 to about 60 minutes, most preferably at room temperature, for about 5 to about 45 minutes and most preferably about 15 to about 30. Typical sulfonating agents are described in U.S. Pat. Nos. 3,642,728 and 3,836,511, previously incorporated herein by reference. These sulfonating agents are selected from an acryl sulfate, a mixture of sulfuric acid and an acid anhydride or a complex of a sulfur trioxide donor and a Lewis base containing oxygen, sulfur, or phosphorus. Typical sulfur trioxide donors are $SO_3$, chlorosulfonic acid, fluorosulfonic acid, sulfuric acid, oleum, etc. Typical Lewis bases are dioxane, tetrahydrofuran, tetrahydrothiophene or triethylphosphate. The most preferred sulfonation agent for this invention is an acyl sulfate selected from the group consisting of benzoyl, acetyl, propionyl and butyryl sulfate. The acyl sulfate can be formed in situ in the reaction medium or pregenerated before its addition to the reaction medium in a chlorinated aliphatic or aromatic hydrocarbon.

It should be pointed out that neither the sulfonating agent nor the manner of sulfonation is critical, provided that the sulfonating method does not degrade the polymer backbone. The reaction is quenched with an aliphatic alcohol, such as methanol, ethanol or isopropanol, with an aromatic hydroxyl compound, such as phenol, a cycloaliphatic alcohol, such as cyclohexanol, or with water. The acid form of the sulfonated elastomeric polymer has about 4 to about 200 meq. $SO_3H$ groups per 100 grams of sulfonated polymer, more preferably about 10 to about 100; and most preferably about 10 to about 50. The meq. of $SO_3H$ grams of polymer is determined by both titration of the polymeric sulfonic acid and Dietert Sulfur analysis. In the titration of the sulfonic acid the polymer is dissolved in solvent consisting of 95 parts of toluene and 5 parts of methanol at a concentration level of 50 grams per liter of solvent. The acid form is titrated with ethanolic sodium hydroxide to an Alizarin-Thymolphthalein end point.

The acid form of the sulfonated terpolymer is gel-free and hydrolytically stable. Gel is measured by stirring a given weight of polymer in a solvent comprises of 95 toluene-5-methanol at a concentration of 5 weight percent for 24 hours, allowing the mixture to settle, withdrawing a weighted sample of the supernatant solution and evaporating to dryness.

Hydrolytically stable means that the acid function, in this case the sulfonic acid, will not be eliminated under neutral or slightly basic conditions to a neutral moiety which is incapable of being converted to highly ionic functionality.

Neutralization of the acid form of the sulfonated terpolymer is done by the addition of a solution of a basic salt to the acid form of the sulfonated elastomeric polymer dissolved in the mixture of the aliphatic alcohol and nonreactive solvent. The basic salt is dissolved in a binary solvent system consisting of water and/or an aliphatic alcohol. The counterion of the basic salt can be selected from antimony, iron, aluminum, lead or Groups IA, IIA, IB or IIB of the Periodic Table of Elements and mixtures thereof. For the purpose of this invention preferred counterions are from the group of transition elements as described below. The anion of the basic salt is selected from a carboxylic acid having from about 1 to about 4 carbon atoms, a hydroxide or alkoxide and mixtures thereof. The preferred neutralizing agent is a metal acetate, more preferably zinc acetate. Sufficient metal salt of the carboxylic acid is added to the solution of the acid form of the elastomeric polymer to effect neutralization. It is preferable to neutralize at least 95% of the acid groups, more preferably about 98%, most preferably 100%.

We have surprisingly found that a very important factor in determining the strength of the interaction between the amine-containing polymer and the sulfonated terpolymer is the nature of the counterion. There are, broadly speaking, three major classes of such counterions. The first class, which are less preferred, are those metals of Group I and Group IIA, which include Li, Na, K, etc., Be, Mg, Ca, etc. We have found that these species do not interact as strongly with amine groups as the more preferred species described below. Those metals are commonly defined as members of the transition elements (see chemical text: *Chemical Principles and Properties*, by M. J. Sienko and R. A. Plane, McGraw Hill Book Company, 1974, page 19). These metal cations are best exemplified by zinc and interact strongly with pyridine and similar amines. As a consequence, a zinc neutralized sulfonated terpolymer interacts much more strongly with a styrene/vinyl pyridine copolymer than does a magnesium or sodium neutralized system. It is for this reason that the transition elements are preferred, with zinc, copper, iron, nickel and cobalt being especially preferred. We also include antimony and lead as suitable cations. Other suitable counterions are titanium, vanadium, chromium and manganese.

A third species is the free acid of the sulfonated terpolymer, which will also interact with amine-containing polymers. In this latter case, it is clear that the interaction is a classic acid-base interaction, while with the transition metals a true coordination complex is created, which is due to the donation of the electron pair of the nitrogen element. This distinction is a very important one and sets these complexes apart from classic acid-base interactions. The surprising observation is that such coordination complexes can form in such extreme dilution insofar as interacting groups are concerned, and that they are apparently formed so far removed from their expected stoichiometry (based on small molecule analogs). In the case of acid-base adducts, this invention covers specifically the acid form of sulfonated terpolymer. These systems contain the low levels of acid groups coupled with the saturated polymer backbones which combine to make the acid-base adducts especially preferred.

The amount of vinyl pyridine in the aminecontaining polymer can vary widely, but should range from less than 50 mole percent down to at least 0.5 mole percent.

Preferably, the amine content in the basic polymer is expressed in terms of basic nitrogen. In this respect the nitrogen content in amides and similar nonbasic nitrogen functionality is not part of the interacting species. A minimum of three basic groups must be present on the average per polymer molecule and the basic nitrogen content generally will range from 4 meq. per 100 grams of polymer up to 500 meq. per 100 grams. A range of 8 to 200 meq. per 100 grams is preferred.

A means of characterizing the apparent molecular weight of a polymer involves the use of melt rheological measurements. For ionic polymers this is the preferred method since solution techniques are difficult to interpret due to the complex nature of the ionic associations. Melt rheological measurements of apparent viscosity at a controlled temperature and shear rate can be used as a measure of apparent molecular weight of an ionic polymer. Although the exact relationship between melt viscosity and apparent molecular weight for these ionic systems is not known, for the purposes of this invention the relationship will be assumed to be one of direct proportionality. Thus, in comparing two materials, the one with the higher melt viscosity will be associated with the higher apparent molecular weight.

The styrene-vinyl pyridine polymers of the polymer complex are formed by free radical copolymerization using techniques well-known in the polymer literature. Such polymers can be prepared by a variety of techniques with styrene, t-butyl styrene, alkyl acrylates, alkyl methacrylates, butadiene, isoprene vinyl chloride, acrylonitrile, acrylonitrile/butadiene/styrene monomer mixtures and copolymers, or more complex mixtures. An emulsion polymerization process is generally preferred, but other processes are also acceptable.

The polymer complex is formed by either mixing solutions of the individual polymers or, alternatively, by mixing both polymers in a common solvent.

The present invention describes a method for reducing the frictional drag of an organic liquid in flow through pipes or conduits having a continuous bore therethrough which comprises adding about 0.001 to about 0.5 grams of a polymeric complex to 100 ml of said organic liquid, wherein the polymeric complex is the reaction product of a metal neutralized sulfonated octene-1/ethylene/ethylidene norborene terpolymer and a basic nitrogen-containing copolymer, said basic nitrogen containing copolymer being a copolymer of vinyl pyridine with another monomer selected from the group consisting of styrene, t-butyl styrene, alkylacrylate, alkylmethacrylate, butadiene, isoprene, vinyl chloride and acrylonitrile The following Examples illustrate the present invention without, however, limiting the same hereto.

EXAMPLE 1

Preparation of Zinc-Sulfo-Octene-1 Terpolymer a. Polymerization

A terpolymer of octene-1, ethylene and ENB was prepared in a five liter, well stirred vessel. The charges were: 2,500 ml cyclohexane, 500 ml octene-1, 20 ml ENB and an ethylene feed at a rate of 20 grams per hour. The temperature was kept at 25° C. with nitrogen purge. The catalyst containing 5.81 grams of $VCl_4$ and 29.3 grams of ethylene-sesquichloride in a hexane solution was added to the reactor at eight increments of 15 minutes apart. The reaction was terminated four hours after the increment of catalyst addition by precipitation in 3.5 gallons of isopropanol containing a blend of 30 ml concentrated hydrochloric acid and 70 ml of water. The recovered polymer was purified by redissolving in hot cyclohexane and precipitation in a blend of acetone-isopropanol containing 2 grams of Irganox 1010 antioxidant. The polymer was then vacuum dried at 70° C., with a final yield of 105 grams. The inherent viscosity in decalin at 135° C. was 0.24.

b. Sulfonation

The polymer of Example 1a was sulfonated using the following procedure: 103 grams of polymer was dissolved in 1,169 grams of cyclohexane. Sulfonation was effected by the addition of 20.8 ml of acetyl-sulfate at 28° C. After 30 minutes a neutralization agent containing 10.5 grams of zinc-acetate in 120 ml of methanol was added. The polymer was then precipitated in methanol and was vacuum dried at 70° C.

The product contained 15.2 milliequivalents of sulfonate and 0.73 weight percent of zinc.

EXAMPLE 2

Complex Formation

The sulfonated polymer of Example 1b was dissolved in xylene at a concentration of one weight percent (Solution A). A second solution was prepared by dissolving polystyrene-vinylpyridine in xylene at a concentration of one weight percent (Solution B). The second polymer contained 8 mole percent of pyridine.

The two solutions were mixed at a few ratios to obtain complexes of zinc-sulfo-octene-1 terpolymers with styrene-vinylpyridine.

The viscosity of various complexes is shown in Table I.

TABLE I

| Viscosities of Interpolymer Networks in Xylene at 1 Wt. % and 25° C. | | |
|---|---|---|
| Composition Solution A/Solution B | Viscosity cP | Shear Rate 1/sec |
| 100/0 | 0.91 | 300 |
| 90/10 | 1,726 | 1.9 |
| 80/20 | 15,340 | 1.3 |
| 50/50 | 1,342 | 22 |
| 0/100 | 6.0 | 300 |

The data in Table I indicate a strong interaction between the polymers in Solutions A and B. The composition of 80/20 shows the highest viscosity is close to the stoichiometric ratio of functional groups in both polymers.

EXAMPLE 3

Drag Reduction of Improved Interpolymer Complexes

Drag reduction was evaluated by flowing polymer/xylene solutions through a 2.13 mm inside diameter stainless steel tube and measuring the resulting frictional pressure drops and flow rates. The flows were generated by loading a pair of stainless steel tanks (1 liter each) with a previously dissolved polymer/xylene solution, pressurizing the tanks with nitrogen gas (300 kPa) and discharging the solution through the tube test section. Pressure drops were measured across by weighing samples of the effluent liquid collected over measured time periods.

Flow rates in the drag reduction experiments ranged from about 12 to 25 g/s; these correspond to solvent Reynolds number from about 12,000 to 25,000 (solvent Reynolds number=mean flow velocity times tube diameter divided by solvent kinematic viscosity). Drag reduction was measured by comparing flow rates of the polymer/xylene solutions with flow rates of the xylene solvent at equal pressure drops of 112 kPa/m. Results were expressed as percent flow enhancement, which is defined as:

$$\text{Percent Flow Enhancement} = 100 \times \frac{\text{Flow Rate of solution} - \text{Flow Rate of solvent}}{\text{Flow Rate of Solvent}}$$

Comparisons of two new Zn-S-octene complexes with Zn-S-EPDM complexes are given in Table II. One of the Zn-S-octene polymers (GL-76) is described in Example 1 and Example 2; the other was prepared via similar procedures. The difference between the polymers is identified in Table II. Also included in the table are baseline data for the styrene-vinylpyridine copolymer used to form complexes with the other sulfonated polymers; none of the sulfonated polymers show any flow enhancement at 125 ppm concentrations. The data demonstrate that Zn-S-octene complexes produce levels of drag reduction activity comparable to the Zn-S-EPDM complexes. The data also suggest that lower molecular weight (inferred from unsulfonated polymer backbone inherent viscosities) sulfonated polymers form more efficient drag reduction complexes with this particular styrene-vinylpyridine copolymer.

TABLE II

| Flow Enhancement Results for Sulfo-Octene Complexes | |
|---|---|
| Polymers | First Pass % Flow Enhancement |
| 125 ppm SVP (Baseline) | 56 |
| 125 ppm SVP + 125 ppm Zn—S—EPDM #1 (GL-75A) | 76 |
| 125 ppm SVP + 125 pm Zn—S—EPDM #2 (GL-88X) | 106 |
| 125 ppm SVP + 125 ppm Zn—S—octene #1 (GL-78) | 90 |
| 125 ppm SVP + 125 ppm Zn—S—octene #2 (GL-76) | 97 |

SVP = styrene-vinylpyridine, 8 mole % vinylpyridine, m.w. ≈3,000,000;
Zn—S—EPDM #1 = 10 meq $SO_3$/100 g polymer with inherent viscosity of 1.5;
Zn—S—EPDM #2 = 15 meq $SO_3$/100 g polymer with inherent viscosity of ≈0.3;
Zn—S—octene #1 = 11.2 meq $SO_3$/100 g polymer with inherent viscosity of 0.45;
Zn—S—octene #2 = 15.2 meq $SO_3$/100 g polymer with inherent viscosity of 0.24.

What is claimed is:

1. A method for reducing the frictional drag of an organic liquid in flow through pipes or conduits having a continuous bore therethrough which comprises adding about 0.001 to about 0.5 grams of a polymeric complex to 100 ml of said organic liquid, wherein the polymeric complex is the reaction product of a metal neutralized sulfonated octene-1/ethylene/ethylidene norborene terpolymer and a basic nitrogencontaining copolymer, said basic nitrogen containing copolymer being a copolymer of vinylpyridine with another monomer selected from the group consisting of styrene, t-butyl styrene, alkylacrylate, alkylmethacrylate, butadiene, isoprene, vinyl chloride and acrylonitrile.

2. A method according to claim 1 wherein said styrene/vinylpyridine copolymer contains about 0.5 to about 50 mole percent of vinylpyridine.

3. A method according to claim 1 wherein said sulfonated polymer is in excess of said basic nitrogen containing polymer.

4. A method according to claim 1 wherein said basic nitrogen containing polymer is in excess of said sulfonated terpolymer.

* * * * *